United States Patent
Niu et al.

(10) Patent No.: US 7,860,128 B2
(45) Date of Patent: Dec. 28, 2010

(54) SYSTEM AND METHOD FOR WIRELESS COMMUNICATION OF UNCOMPRESSED VIDEO HAVING A PREAMBLE DESIGN

(75) Inventors: Huaning Niu, Sunnyvale, CA (US); Pengfei Xia, Mountain View, CA (US); Chiu Ngo, San Francisco, CA (US)

(73) Assignee: Samsung Electronics Co., Ltd., Suwon, Kyungki-Do (KR)

( * ) Notice: Subject to any disclaimer, the term of this patent is extended or adjusted under 35 U.S.C. 154(b) by 928 days.

(21) Appl. No.: 11/735,405

(22) Filed: Apr. 13, 2007

(65) Prior Publication Data
US 2008/0056393 A1 Mar. 6, 2008

Related U.S. Application Data (60) Provisional application No. 60/817,523, filed on Jun. 28, 2006.

(51) Int. Cl.
*H04B 7/208* (2006.01)
(52) U.S. Cl. .................. 370/474; 370/206; 370/344
(58) Field of Classification Search ............ 370/474, 370/204, 206, 344, 476
See application file for complete search history.

(56) References Cited

U.S. PATENT DOCUMENTS

| | | | |
|---|---|---|---|
| RE39,111 E | 5/2006 | Oshima | |
| 2002/0065047 A1* | 5/2002 | Moose | 455/63 |
| 2003/0043887 A1* | 3/2003 | Hudson | 375/144 |
| 2004/0179507 A1* | 9/2004 | Batra et al. | 370/343 |
| 2004/0190560 A1* | 9/2004 | Maltsev et al. | 370/503 |
| 2005/0096001 A1* | 5/2005 | Kandala | 455/269 |
| 2005/0276347 A1* | 12/2005 | Mujtaba et al. | 375/299 |
| 2006/0007898 A1* | 1/2006 | Maltsev et al. | 370/338 |
| 2006/0018249 A1* | 1/2006 | Shearer et al. | 370/208 |
| 2006/0039491 A1* | 2/2006 | Han | 375/260 |
| 2006/0209892 A1* | 9/2006 | MacMullan et al. | 370/468 |

(Continued)

FOREIGN PATENT DOCUMENTS

KR 10-2005-0060632 6/2005

OTHER PUBLICATIONS

FreshNews.com, SiBEAM Receives Equity Investment from Best Buy, http://freshnews.com/print/node/261440, Jan. 4, 2010, 2 pages.

(Continued)

*Primary Examiner*—Brian D Nguyen
(74) *Attorney, Agent, or Firm*—Knobbe Martens Olson & Bear, LLP (57) ABSTRACT

A method and system for transmitting uncompressed video information from a sender to a receiver over a wireless channel is described. Uncompressed video information bits are provided at the sender and the video information bits are packetized into one or more packets. A preamble to precede the data in each packet is provided, where the preamble includes a set of short training sequences and a set of long training sequences. Multiple packets are transmitted from the sender to the receiver over a wireless channel. In certain embodiments, the set of short training sequences includes seven short training sequences and the set of long training sequences includes two long training sequences, and the total length of the preamble is five orthogonal frequency-division multiplexing (OFDM) symbols long.

25 Claims, 9 Drawing Sheets

U.S. PATENT DOCUMENTS

| | | | |
|---|---|---|---|
| 2007/0004437 A1* | 1/2007 | Harada et al. | 455/506 |
| 2007/0008219 A1* | 1/2007 | Hoffmann et al. | 342/367 |
| 2007/0089144 A1* | 4/2007 | Du Breuil et al. | 725/81 |
| 2008/0002650 A1 | 1/2008 | Xia et al. | |

OTHER PUBLICATIONS

International Preliminary Report on Patentability dated Jan. 6, 2009 in PCT/KR2007/003155, filed Jun. 28, 2007.

PCT International Search Report from PCT/KR2007/003155, mailed Oct. 9, 2007.

Wireless HD Specification Version 1.0 Overview, Oct. 9, 2007, 77 pgs.

"NEC Develops Compact Millimeter-Wave Transceiver for Uncompressed HDTV Signal Transmission", Apr. 5, 2005, 2 pgs.

Mark Hachman, "CE Giants Back Amimon's Wireless HDTV Tech", PCMAG.com, Jul. 23, 2008, 1 pg.

* cited by examiner

SYSTEM AND METHOD FOR WIRELESS COMMUNICATION OF UNCOMPRESSED VIDEO HAVING A PREAMBLE DESIGN

RELATED APPLICATION

This application claims priority from U.S. Provisional Patent Application No. 60/817,523, filed on Jun. 28, 2006, which is incorporated herein by reference.

BACKGROUND

1. Field of the Invention

The invention relates to wireless transmission of video information, and in particular, to transmission of uncompressed high definition video information over wireless channels.

2. Description of the Related Art

With the proliferation of high quality video, an increasing number of electronic devices, such as consumer electronic devices, utilize high definition (HD) video which can require multiple gigabit per second (Gbps) in bandwidth for transmission. As such, when transmitting such HD video between devices, conventional transmission approaches compress the HD video to a fraction of its size to lower the required transmission bandwidth. The compressed video is then decompressed for consumption. However, with each compression and subsequent decompression of the video data, some data can be lost and the picture quality can be reduced.

The High-Definition Multimedia Interface (HDMI) specification allows transfer of uncompressed HD signals between devices via a cable. While consumer electronics makers are beginning to offer HDMI-compatible equipment, there is not yet a suitable wireless (e.g., radio frequency) technology that is capable of transmitting uncompressed HD video signals. Wireless local area network (WLAN) and similar technologies can suffer interference issues when several devices are connected which do not have the bandwidth to carry the uncompressed HD signals.

SUMMARY

In one embodiment, there is a method of transmitting uncompressed video information from a sender to a receiver over a wireless channel, the method comprising providing uncompressed video information bits at the sender, packetizing the video information bits into one or more packets, providing a preamble to precede the data in each packet, wherein the preamble includes a set of short training sequences and a set of long training sequences, and transmitting multiple packets from the sender to the receiver over a wireless channel.

The preamble may be inserted into the packet prior to symbol shaping, upconversion, and the transmitting. The total length of the preamble may be five orthogonal frequency-division multiplexing (OFDM) symbols long. Each short training sequence may be 256 samples, and each long training sequence may be 512 samples. The set of short training sequences may include seven short training sequences and the set of long training sequences may include two long training sequences. The set of short training sequences may comprise a repetition of a certain sequence, with the last repetition rotated by 180 degrees. The set of short training sequences may comprise a repetition of a certain sequence, with the last repetition not rotated by 180 degrees. A length 64 guard interval may separate the set of short training sequences and the set of long training sequences. The preamble may comprise seven length 256 short training sequences, a length 64 guard interval and two length 512 long training sequences for a total length of five OFDM symbols. Each short training sequence may be defined in a frequency domain using quadrature phase shift keying (QPSK) signals and each long training sequence may be defined in the frequency domain using binary phase shift keying (BPSK) signals.

In another embodiment, there is a system having a preamble design for wireless communication of uncompressed high definition video, the system comprising a transmitter configured to generate signal packets corresponding to a high definition video stream, wherein each signal packet comprises a header portion and video data portion, wherein the header portion begins with a preamble having a set of short training sequences and a set of long training sequences; and a wireless channel configured to transmit the signal packets representative of the uncompressed high definition video.

Each short training sequence may be defined in a frequency domain using quadrature phase shift keying (QPSK) signals and each long training sequence may be defined in the frequency domain using binary phase shift keying (BPSK) signals. The total length of the preamble may be five orthogonal frequency-division multiplexing (OFDM) symbols long. Each short training sequence may be 256 samples, and each long training sequence may be 512 samples. The set of short training sequences may include seven short training sequences and the set of long training sequences may include two long training sequences. The set of short training sequences may comprise a repetition of a certain sequence, with the last repetition rotated by 180 degrees. The set of short training sequences may comprise a repetition of a certain sequence, with the last repetition not rotated by 180 degrees. A length 64 guard interval may separate the set of short training sequences and the set of long training sequences. The preamble may comprise seven length 256 short training sequences, a length 64 guard interval and two length 512 long training sequences for a total length of five OFDM symbols.

In yet another embodiment, there is a system for transmitting uncompressed video information from a sender to a receiver over a wireless channel, the system comprising means for providing uncompressed video information bits at the sender, means for packetizing the video information bits into one or more packets, means for providing a preamble to precede the data in each packet, wherein the preamble includes a set of short training sequences and a set of long training sequences, and means for transmitting multiple packets from the sender to the receiver over a wireless channel.

Each short training sequence may be 256 samples, and each long training sequence may be 512 samples. The preamble may comprise seven length 256 short training sequences, a length 64 guard interval and two length 512 long training sequences for a total length of five OFDM symbols. Each short training sequence may be defined in a frequency domain using quadrature phase shift keying (QPSK) signals and each long training sequence may be defined in the frequency domain using binary phase shift keying (BPSK) signals.

DETAILED DESCRIPTION OF CERTAIN INVENTIVE EMBODIMENTS

The following detailed description of certain embodiments presents various descriptions of specific embodiments of the invention. However, the invention can be embodied in a multitude of different ways as defined and covered by the claims. In this description, reference is made to the drawings wherein like parts are designated with like numerals throughout.

The terminology used in the description presented herein is not intended to be interpreted in any limited or restrictive manner, simply because it is being utilized in conjunction with a detailed description of certain specific embodiments of the invention. Furthermore, embodiments of the invention may include several novel features, no single one of which is solely responsible for its desirable attributes or which is essential to practicing the inventions herein described.

Certain embodiments provide a method and system for transmission of uncompressed HD video information from a sender to a receiver over wireless channels. The video information is placed into packets having a header, which includes a preamble. The preamble described hereinbelow is more efficient than previously described preambles, has better performance in terms of correlation properties, and is easier to implement.

Figure 1:
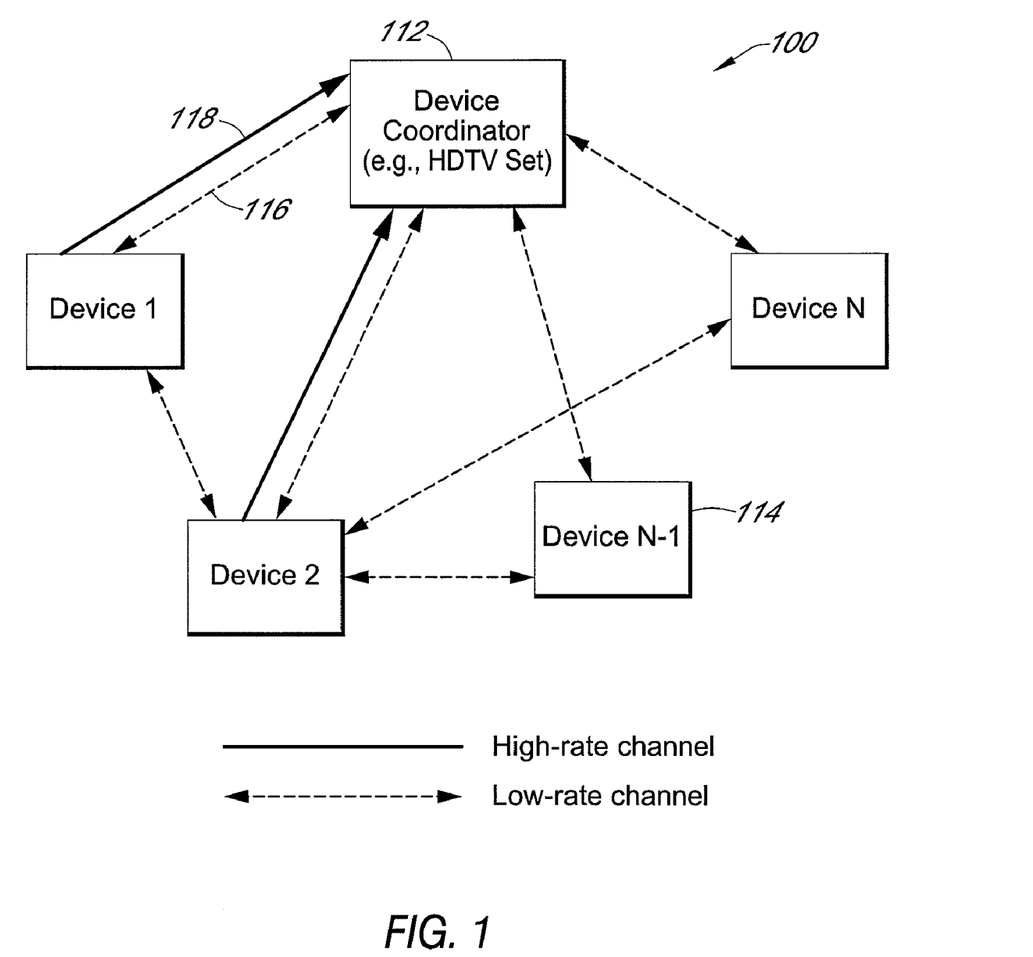
FIG. 1 is a functional block diagram of an exemplary configuration of a wireless network that implements uncompressed HD video transmission between wireless devices according to one embodiment of the system and method.

Example implementations of the embodiments in a wireless high definition (HD) audio/video (A/V) system will now be described. FIG. 1 shows a functional block diagram of a wireless network 100 that implements uncompressed HD video transmission between A/V devices such as an A/V device coordinator and A/V stations, according to certain embodiments. In other embodiments, one or more of the devices can be a computer, such as a personal computer (PC). The network 100 includes a device coordinator 112 and multiple A/V stations 114 (e.g., Device 1 ... Device N).

The A/V stations 114 utilize a low-rate (LR) wireless channel 116 (dashed lines in FIG. 1), and may use a high-rate (HR) channel 118 (heavy solid lines in FIG. 1), for communication between any of the devices. The device coordinator 112 uses a low-rate channel 116 and a high-rate wireless channel 118, for communication with the stations 114. Each station 114 uses the low-rate channel 116 for communications with other stations 114. The high-rate channel 118 supports single direction unicast transmission over directional beams established by beamforming, with e.g., multi-Gb/s bandwidth, to support uncompressed HD video transmission. For example, a set-top box can transmit uncompressed video to a HD television (HDTV) over the high-rate channel 118. The low-rate channel 116 can support bi-directional transmission, e.g., with up to 40 Mbps throughput in certain embodiments. The low-rate channel 116 is mainly used to transmit control frames such as acknowledgement (ACK) frames. For example, the low-rate channel 116 can transmit an acknowledgement from the HDTV to the set-top box. It is also possible that some low-rate data like audio and compressed video can be transmitted on the low-rate channel between two devices directly. Time division duplexing (TDD) is applied to the high-rate and low-rate channel. At any one time, the low-rate and high-rate channels cannot be used in parallel for transmission, in certain embodiments. Beamforming technology can be used in both low-rate and high-rate channels. The low-rate channels can also support omni-directional transmissions.

In one example, the device coordinator 112 is a receiver of video information (hereinafter "receiver 112"), and the station 114 is a sender of the video information (hereinafter "sender 114"). For example, the receiver 112 can be a sink of video and/or audio data implemented, such as, in an HDTV set in a home wireless network environment which is a type of WLAN. The sender 114 can be a source of uncompressed video or audio. Examples of the sender 114 include a set-top box, a DVD player or recorder, digital camera, camcorder, and so forth.

Figure 2:
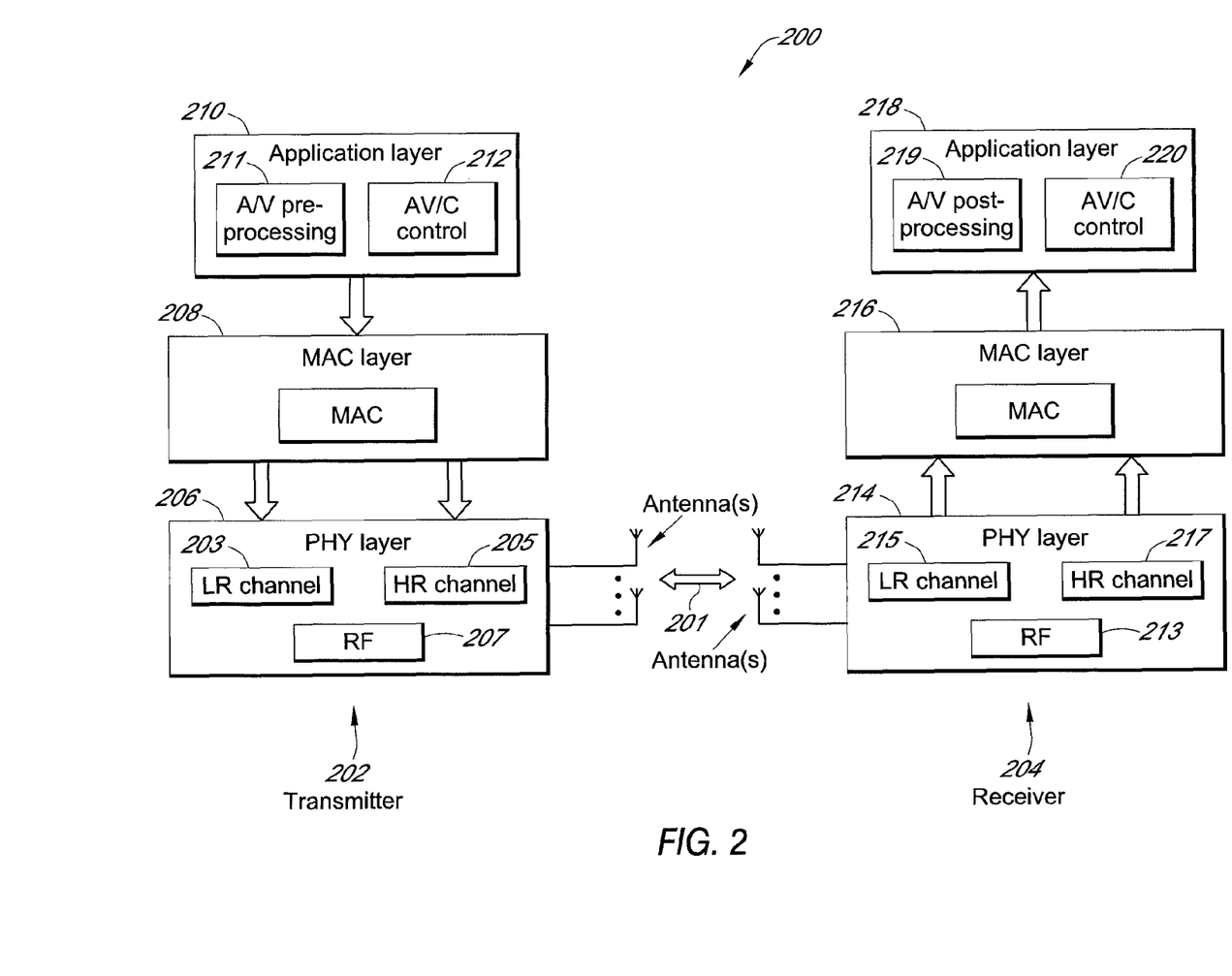
FIG. 2 is a functional block diagram of an example communication system for transmission of uncompressed HD video over a wireless medium, according to one embodiment of the system and method.

FIG. 2 illustrates a functional block diagram of an example communication system 200. The system 200 includes a wireless transmitter 202 and wireless receiver 204. The transmitter 202 includes a physical (PHY) layer 206, a media access control (MAC) layer 208 and an application layer 210. Similarly, the receiver 204 includes a PHY layer 214, a MAC layer 216, and an application layer 218. The PHY layers provide wireless communication between the transmitter 202 and the receiver 204 via one or more antennas through a wireless medium 201.

The application layer 210 of the transmitter 202 includes an A/V pre-processing module 211 and an audio video control (AV/C) module 212. The A/V pre-processing module 211 can perform pre-processing of the audio/video such as partitioning of uncompressed video. The AV/C module 212 provides a standard way to exchange A/V capability information. Before a connection begins, the AV/C module negotiates the A/V formats to be used, and when the need for the connection is completed, AV/C commands are used to stop the connection.

In the transmitter 202, the PHY layer 206 includes a low-rate (LR) channel 203 and a high rate (HR) channel 205 that are used to communicate with the MAC layer 208 and with a radio frequency (RF) module 207. In certain embodiments, the MAC layer 208 can include a packetization module (not shown). The PHY/MAC layers of the transmitter 202 add PHY and MAC headers to packets and transmit the packets to the receiver 204 over the wireless channel 201.

In the wireless receiver 204, the PHY/MAC layers 214, 216, process the received packets. The PHY layer 214 includes a RF module 213 connected to the one or more antennas. A LR channel 215 and a HR channel 217 are used to communicate with the MAC layer 216 and with the RF module 213. The application layer 218 of the receiver 204 includes an A/V post-processing module 219 and an AV/C module 220. The module 219 can perform an inverse processing method of the module 211 to regenerate the uncompressed video, for example. The AV/C module 220 operates in a complementary way with the AV/C module 212 of the transmitter 202.

In certain embodiments, every packet has a preamble that is part of a packet header. Processing of the preamble is performed in the PHY layer. A previously known preamble is eight orthogonal frequency-division multiplexing (OFDM) symbols long. The first four OFDM symbols are defined in the time domain, and the last four OFDM symbols are defined in the frequency domain. Since each OFDM symbol is about 230 ns in duration, the eight OFDM symbols have a duration of 1.84 μs.

Figure 3:
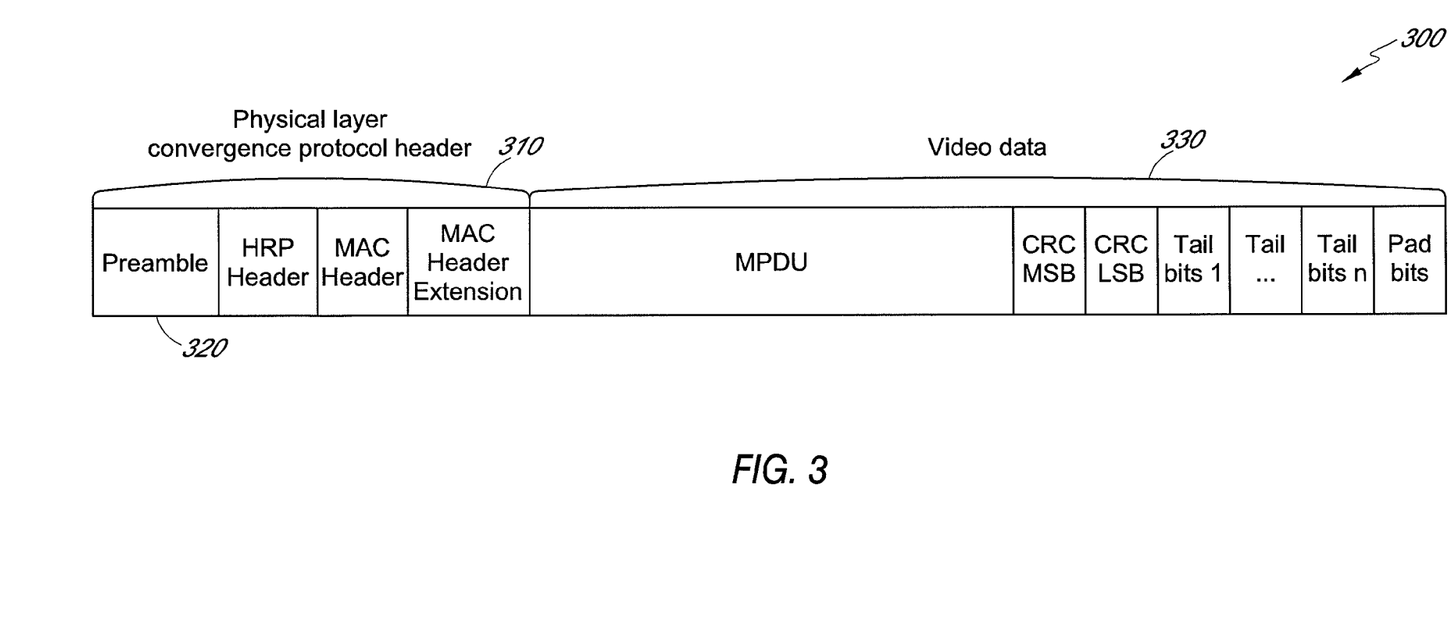
FIG. 3 is a diagram of an embodiment of a packet such as used in the network and system shown in FIGS. 1 and 2.

Referring to FIG. 3, an embodiment of a packet 300 will be described. The packet 300 includes a physical layer convergence protocol (PLCP) header 310 and a video data portion 330. The PLCP header 310 includes a preamble 320 and other fields. In certain embodiments, the other fields include a high-rate physical layer (HRP) header, a MAC header and a MAC header extension, which can be a header check sequence (HCS). In certain embodiments, the video data portion 330 includes a MAC protocol data unit (MPDU) data field, cyclic redundancy check (CRC) information, tail bits and pad bits.

Figure 4:
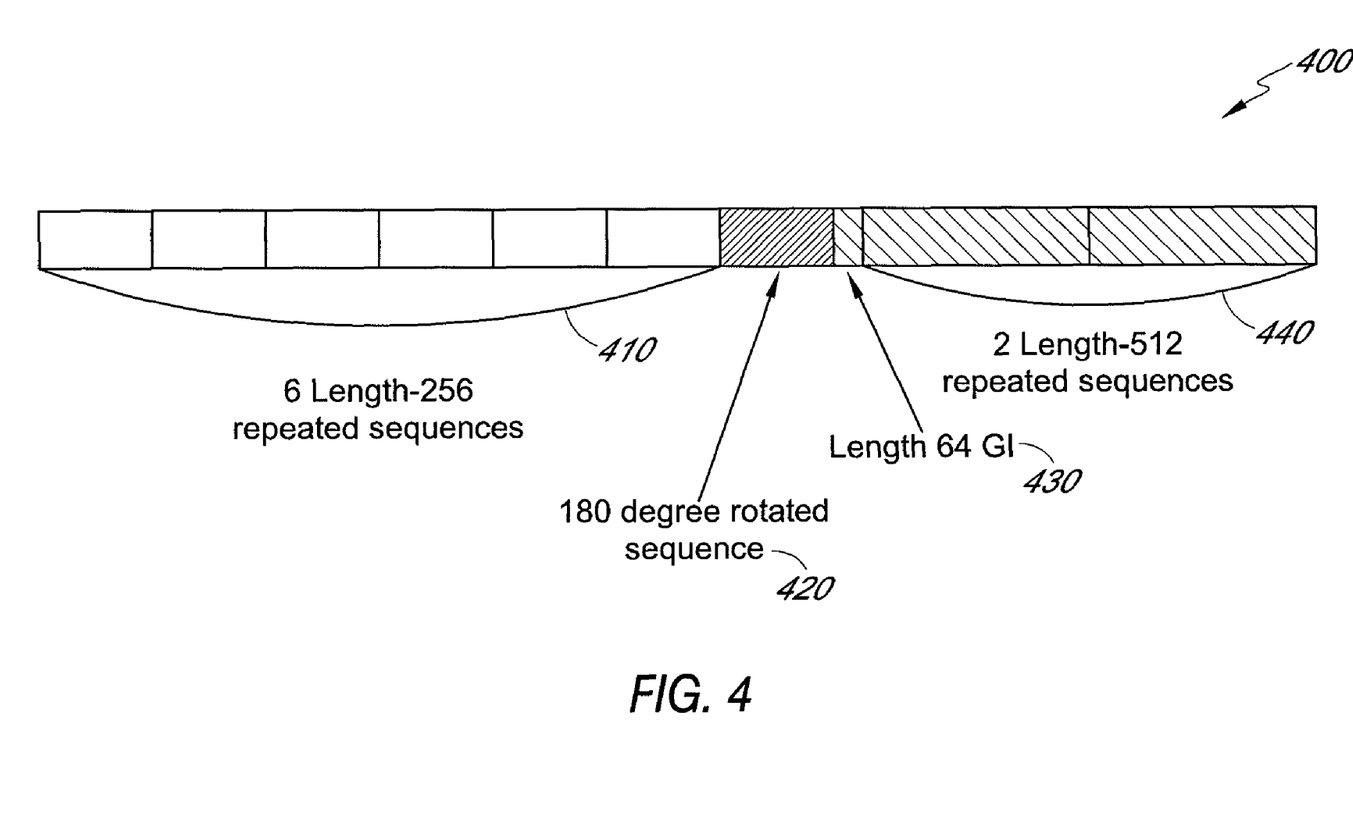
FIG. 4 is a diagram of an embodiment of a preamble design such as used in the packet shown in FIG. 3.

Referring to FIG. 4, an embodiment of a preamble 400, such as the preamble 320 shown in FIG. 3, will be described. The preamble 400 includes seven short training sequences 410 and 420, and two long training sequences 440. In certain embodiments, each short training sequence is 256 samples (where each sample can be a complex number) long, while the last sequence 420 of the short training sequences is rotated by 180 degrees to indicate the end of the short sequences and beginning of the long sequences. Each long training sequence is 512 samples long, with a 64 sample guard interval (GI) 430, which is also known as a cyclic prefix (CP), located between the short training sequences 410 and 420, and the long training sequences 440. The total length of the preamble 400 is five OFDM symbols long (256*7+64+512*2=2880=576*5). The duration of the preamble is 5*230 ns=1.15 μs, which compares very favorably to the 1.84 μs duration preamble previously known. In other embodiments, other numbers of samples for the short training sequence and/or long training sequence could be used. In one of the other embodiments, the number of samples in the long training sequence is twice the number of samples in the short training sequence.

The length-256 short training sequence 410 is defined in the frequency domain using quadrature phase shift keying (QPSK) signals with inserted zeros. In QPSK, two data bits map to one symbol (a complex number). The QPSK signals are placed on tones [−178:2:−2 2:2:178] (i.e., tone index −178, −176, . . . −2, 2, 4, . . . 178), and zeroes are inserted on the other tones. Each tone represents a small band or subcarrier, such as in a bandwidth between 59 GHz to 61 GHz. In certain embodiments, 512 bands are used. The QPSK signals are obtained by a random search to minimize the time domain peak to average ratio (PAPR) and the dynamic range (peak to dip) ratio so as to make the signals transmittable, and improve the acquisition performance. In one embodiment, the random search produced the following short training sequence:

```
STF_-178, 178 = sqrt(1/2) {1 + i, 0, 1 + i, 0, -1 - i, 0, 1 - i, 0, 1 + i, 0, -1 - i, 0, -1 - i, 0, -1 + i, 0, 1 + i, 0, 1 - i, 0, 1 - i, 0, -1 - i, 0, -1 - i, 0, 1 + i, 0, -1 - i, 0, -1 - i, 0, 1 - i 0, -1 + i, 0, 1 + i, 0, 1 + i, 0, -1 + i, 0, -1 - i, 0, -1 + i, 0, 1 - i, 0, 1 + i, 0, -1 - i, 0, 1 - i, 0, -1 + i, 0, -1 - i, 0, -1 + i, 0, 1 - i, 0, -1 + i, 0, -1 - i, 0, -1 - i, 0, 1 + i, 0, -1 - i, 0,

1 + i, 0, -1 + i, 0, -1 + i, 0, 1 + i, 0, -1 + i, 0, -1 - i, 0, -1 - i, 0, -1 - i, 0, 1 + i, 0, 1 - i,

0, -1 + i, 0, 1 - i, 0, 1 + i, 0, 1 - i, 0, -1 + i, 0, -1 + i, 0, -1 - i, 0, -1 - i, 0, -1 - i, 0, -1 - i, 0, 1 - i, 0, -1 + i, 0, 1 + i, 0, -1 + i, 0, 1 + i, 0, -1 + i, 0, 1 - i, 0, -1 + i, 0, 1 + i, 0, 1 - i, 0, 1 + i, 0, -1 - i, 0, 1 - i, 0, 1 - i, 0, -1 + i, 0, 1 - i, 0, 1 - i, 0, -1 - i, 0, 1 + i, 0, 1 - i, 0, 1 + i, 0, 1 + i, 0, -1 - i, 0, 1 - i, 0, 1 + i, 0, -1 + i, 0, 1 - i, 0, -1 - i, 0, 1 - i, 0, 1 + i, 0, -1  i, 0, -1 - i, 0, 1 - i, 0, 1 - i, 0, -1 + i, 0, 1 + i, 0, -1 - i, 0, 1 - i, 0, 1 -1 - i, 0,

-1 - i, 0, 1 - i, 0, -1 - i, 0, 1 - i, 0, 1 + i, 0, 1 - i, 0, 1 - i, 0, 1 - i, 0, 1 - i, 0, -1 - i, 0,

1 + i, 0, 1 + i, 0, -1 - i, 0, -1 - i, 0, -1 - i, 0, 1 - i, 0, -1 - i, 0, -1 - i, 0, 1 - i, 0, 1 - i,

0, -1 + i, 0, -1 + i, 0, -1 - i, 0, 1 + i, 0, -1 - i, 0, 1 + i, 0, -1 + i, 0, 1 - i, 0, 1 - i, 0, -1 + i, 0, 1 - i, 0, -1 - i, 0, -1 + i, 0, -1 + i, 0, -1 + i, 0, 1 - i, 0, -1 + i, 0, 1 + i, 0, -1 + i, 0,

1 + i, 0, 1 - i, 0, 1 - i, 0, 1 + i, 0, 1 - i, 0, 1 + i, 0, -1 + i, 0, -1 + i, 0, 1 - i, 0, -1 - i, 0,

1 + i, 0, 1 - i, 0, -1 + i, 0, 1 + i, 0, -1 + i, 0, -1 - i, 0, 1 - i, 0, 1 + i}
```

Figure 5:
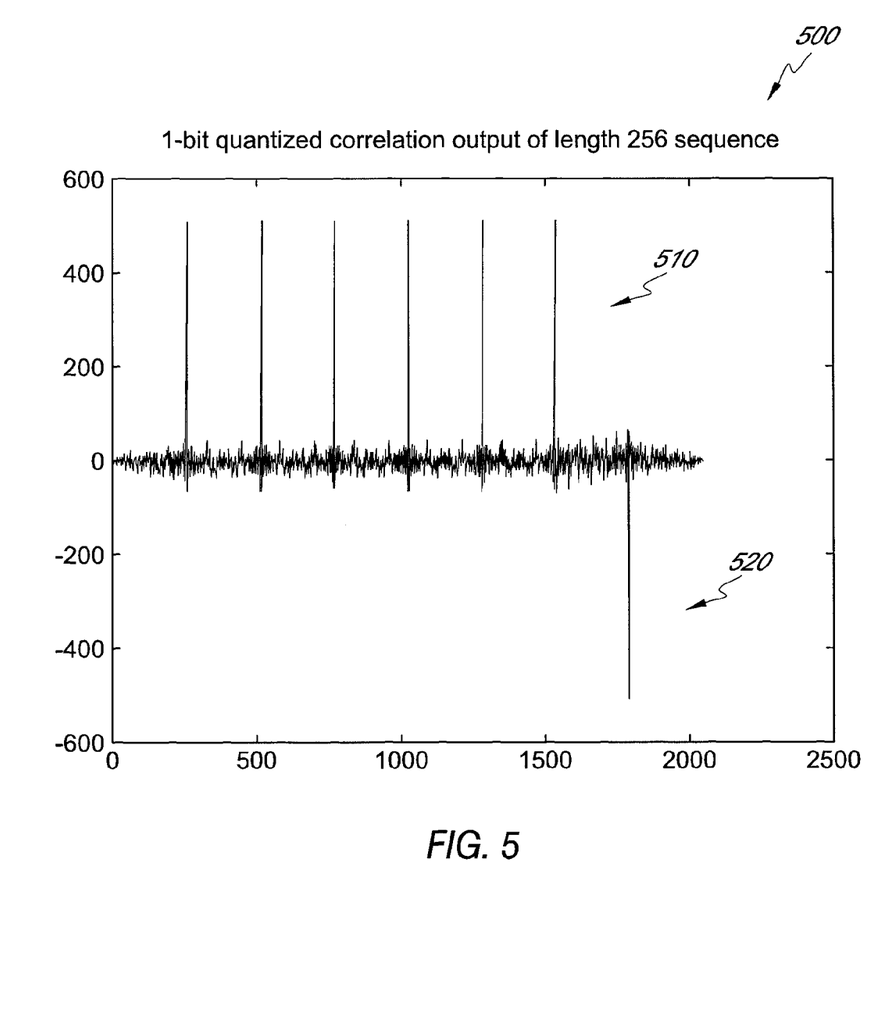
FIG. 5 is a graph showing an example of a one-bit quantized correlation output of a short length sequence of 256 samples such as shown in FIG. 4.

The last sequence 420 of the short training sequences is rotated by 180 degrees. This results in a reversed peak 520 at a correlation output as shown in FIG. 5. The reversed peak 520 can help decide the end of the short sequences of the preamble and the beginning of the long sequences of the preamble.

The length-512 long training sequence 440 is generated in the frequency domain using binary phase shift keying (BPSK) signals. In BPSK, one data bit maps to one symbol (a special complex number=real number). The BPSK signal sequence is generated by a random search to minimize the time domain PAPR. The frequency domain sequence is placed on OFDM tones and is defined as follows:

```
LTF_177, 177 = { -1,  1, -1,  1, -1,  1,  1, -1,  1, -1, -1, -1,  1, -1,  1, -1,  1,  1, -1, -1,  1, -1,  1,  1,
                -1, -1, -1, -1,  1, -1,  1,  1, -1, -1,  1,  1, -1, -1,  1,  1,  1,  1,  1,  1,  1,  1,  1,  1, -1,  1, -1, -1,  1,  1,
                 1,  1,  1, -1, -1, -1, -1,  1, -1, -1,  1, -1, -1, -1, -1, -1, -1, -1,  1, -1, -1, -1,  1,  1, -1, -1,  1,  1,
                 1,  1, -1, -1,  1,  1, -1,  1,  1,  1, -1,  1,  1, -1, -1,  1, -1,  1, -1, -1,  1, -1, -1,  1,  1,  1,  1,  1, -1, -1,
                -1, -1, -1, -1,  1, -1, -1,  1, -1,  1, -1, -1,  1, -1, -1,  1, -1, -1,  1,  1, -1, -1, -1, -1,  1,  1, -1,  1,
                 1,  1,  1,  1,  1,  1,  1, -1, -1,  1, -1,  1, -1, -1, -1,  1,  1, -1,  1,  1, -1,  1,  1, -1,  1, -1, -1,  1, -1,  1,
                 1, -1,  1,  0,  0,  0, -1, -1,  1, -1, -1, -1,  1,  1, -1, -1,  1, -1, -1, -1, -1,  1, -1,  1, -1, -1, -1,  1, -1,
                 1, -1, -1, -1,  1, -1,  1, -1,  1, -1, -1,  1, -1,  1, -1, -1,  1,  1, -1,  1,  1,  1, -1, -1, -1,  1, -1,  1, -1,
                 1, -1,  1,  1,  1, -1, -1, -1,  1,  1, -1, -1, -1, -1, -1,  1,  1,  1, -1,  1, -1, -1, -1,  1, -1,  1, -1,  1,  1,
                 1,  1, -1, -1,  1, -1,  1, -1, -1, -1, -1, -1,  1, -1, -1,  1, -1, -1, -1, -1,  1,  1, -1,  1, -1,  1,  1,  1,  1,
                -1,  1,  1,  1,  1, -1,  1, -1, -1,  1, -1,  1,  1,  1,  1, -1,  1,  1,  1,  1,  1,  1, -1, -1,  1,  1,  1, -1, -1, -1,
                -1,  1, -1, -1,  1,  1,  1,  1, -1,  1,  1, -1, -1, -1,  1,  1,  1, -1, -1, -1, -1,  1,  1,  1,  1, -1, -1,  1,  1,  1,
                 1,  1, -1,}
```

The 64 sample GI 430 is a cyclic prefix of the long training sequence 440 to deal with inter-symbol interference caused by channel delay spread.

Referring to FIG. 5, a graph 500 showing one-bit quantized correlation output of a short length sequence of 256 samples will be described. The x-axis of the graph 500 represents time delay and the y-axis represents correlation value. Using the short sequences 410 (FIG. 4), it is seen in graph 500 that the short sequences have very good correlation properties using one-bit quantized correlation. Graph 500 shows the design of a good sequence with good performance. Correlation peaks 510 have an approximate correlation value of 512 on the graph 500 for easier detection than using previous preamble designs. Additionally, the reversed peak 520 has an approximate correlation value of −512 on the graph 500 for easier detection than using previous preamble designs.

The preamble 400 (FIG. 4) yields higher efficiency and better correlation than previous preamble designs. The efficiency is higher than previous designs because only five OFDM symbols for a duration of 1.15 μs are needed versus eight OFDM symbols for a duration of 1.84 μs in previous designs. Because the preamble is considered to be overhead, having a shorter preamble is more efficient. A further benefit is that the cross correlation process (because of being coherently added) yields bigger peaks than previous designs. Another benefit of preamble 400 is that the definition of the short sequences and long sequences is concise. Therefore, it is easier for an implementer to understand the preamble structure and design a corresponding receiver. For example, fewer tones are needed using the preamble 400 than using previous designs.

Figure 6:
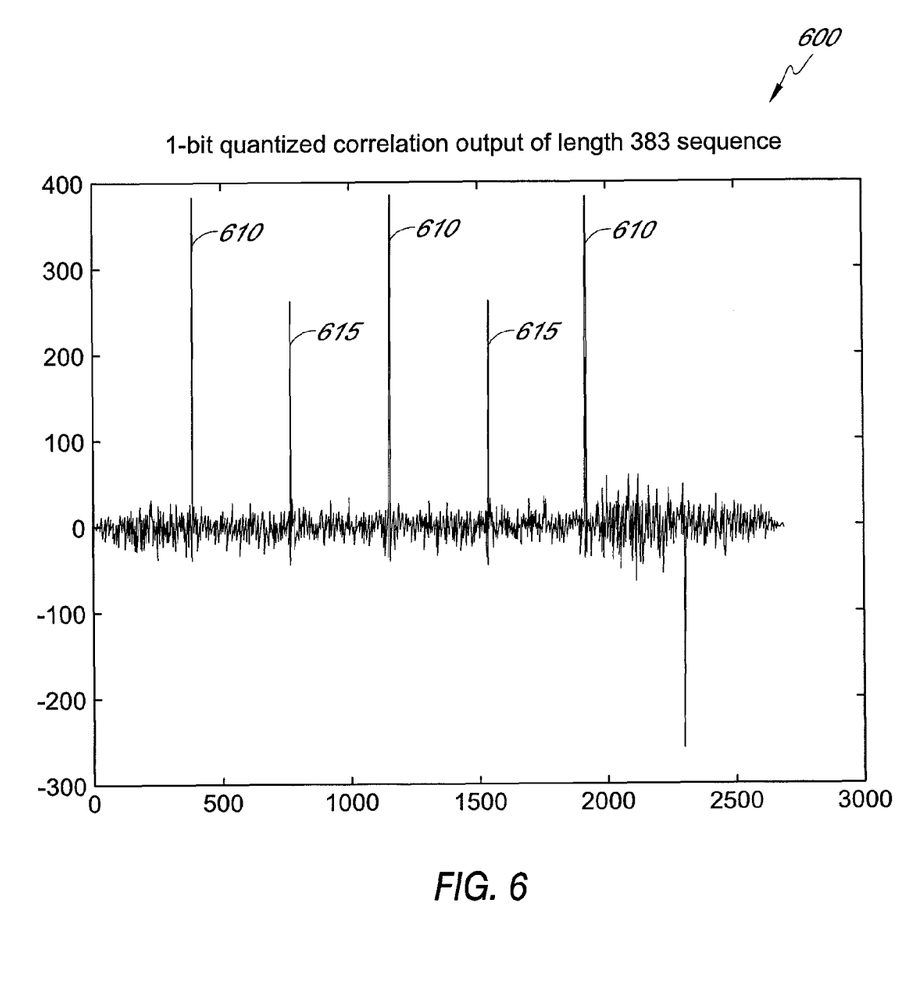
FIG. 6 is a graph showing an example of a one-bit quantized correlation output of a sequence of 383 samples such as used in previous preamble designs.

Referring to FIG. 6, a graph 600 showing one-bit quantized correlation output of a sequence of 383 samples will be described. The x-axis of the graph 600 represents time delay and the y-axis represents correlation value. Graph 600 shows the correlation output for a previous preamble design. Correlation peaks 610 have an approximate correlation value of 383 on the graph 600 and correlation peaks 615 have a value of less than 300, which makes detection more difficult than using the preamble design shown in FIGS. 4 and 5.

Figure 7:
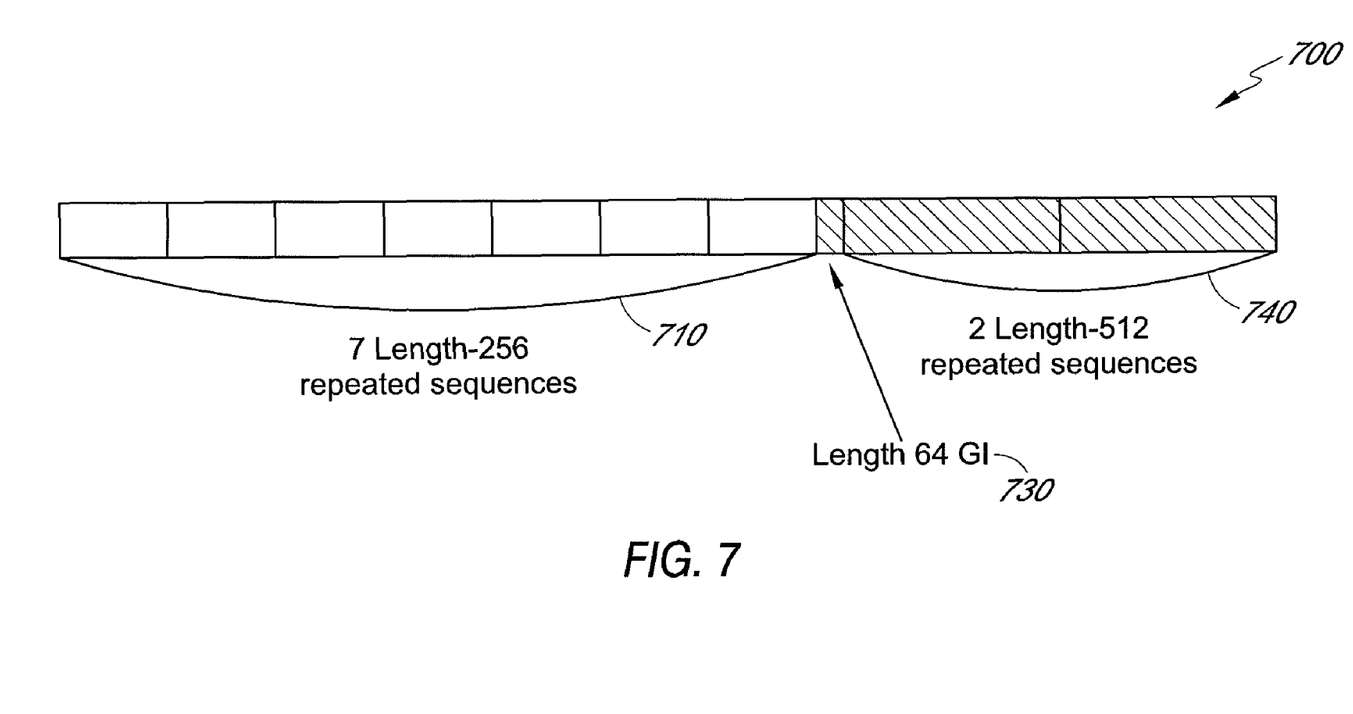
FIG. 7 is a diagram of an alternative embodiment of a preamble design such as used in the packet shown in FIG. 3.

Referring to FIG. 7, an embodiment of a preamble 700, such as the preamble 320 shown in FIG. 3, will be described. In this design, the last short training sequence is not rotated by 180 degrees as is done for sequence 420 in FIG. 4. The end of the short sequences is detected by doing correlation of the last short sequence with the first 256 samples of the first long training sequence. When no peak is detected by the correlation, it is treated as the end of the short training sequences.

The preamble 700 includes seven short training sequences 710 and two long training sequences 740. In certain embodiments, each short training sequence is 256 samples long. Each long training sequence is 512 samples long, with a 64 sample guard interval (GI) 730 located between the short training sequences 710 and the long training sequences 740. The total length of the preamble 700 is five OFDM symbols long (256*7+64+512*2=2880=576* 5).

Figure 8:
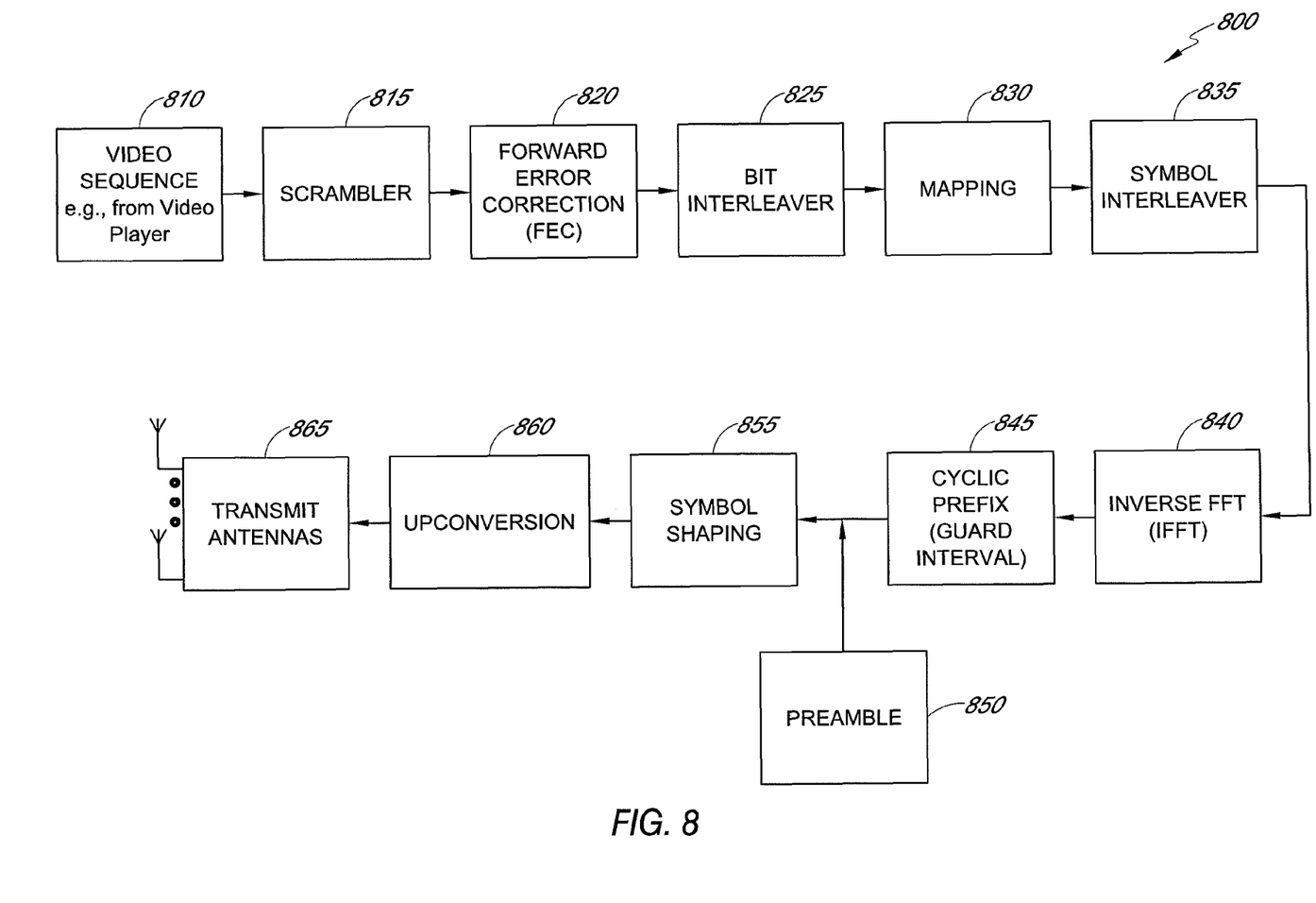
FIG. 8 is a block diagram of an embodiment of a transmitter chain of components such as used in the transmitter shown in FIG. 2.

Referring to FIG. 8, a transmitter chain 800 of modules, subsystems or devices, such as used in the PHY block 206 (FIG. 2), will be described. It will be appreciated that these modules, subsystems, or devices can be implemented using hardware, software or a combination of both. A video sequence 810 having video data, such as from a video player or other device, is input into a scrambler 815. The scrambler 815 transposes or inverts signals or otherwise encodes data to make the data unintelligible at a receiver not equipped with a corresponding descrambling device. Scrambling is accomplished by the addition of components to the original signal or the changing of some important component of the original signal in order to make extraction of the original signal difficult. Examples of the latter can include removing or changing vertical or horizontal sync pulses in video signals.

A forward error correction (FEC) subsystem 820 receives output from the scrambler and provides protection against errors during wireless data transmission. The FEC subsystem 820 adds redundant data to the scrambled video data input to the subsystem. The redundant data allows the receiver to detect and correct errors without asking the transmitter for additional data. In adding redundant data to the video data, the FEC subsystem 820 can use error-coding encoders, such as a Reed-Solomon (RS) encoder and a convolutional code (CC) encoder. In other embodiments, the FEC subsystem 820 may use various other encoders, including, but not limited to, a Golay encoder, a Hamming encoder, and a Bose, Ray-Chaudhuri, Hocquenghem (BCH) encoder.

The output of the FEC 820 is sent to a bit interleaver 825. The bit interleaver 825 rearranges a sequence of data bits received from the FEC 820. The bit interleaver 825 serves to provide further error-protection over video data transmitted over a wireless medium. The output of the bit interleaver 825 is sent to a mapper 830. The mapper 830 maps data bits to complex (IQ) symbols (frequency domain data). The complex symbols are used to modulate a carrier for the wireless transmission described above. The mapper 830 can use various modulation schemes, including, but not limited to, Binary Phase-Shift Keying (BPSK), Quadrature Phase-Shift Keying (QPSK), and Quadrature Amplitude Modulation (QAM). In one embodiment, the mapper 830 is a QAM mapper, for example, a 16-QAM mapper or 64-QAM mapper. QAM is a modulation scheme which conveys data by modulating the amplitude of two carrier waves. The two waves, usually sinusoids, are out of phase with each other by 90° and thus are called quadrature carriers. The number, 16 or 64, in front of "QAM" refers to the total number of symbols to which the mapper can map groups of data bits. For example, a 16-QAM mapper converts 4-bit data into $2^4=16$ symbols. Typically, for QAM mappers, a constellation diagram is used for representing such symbols.

The output of the mapper 830 is sent to a symbol interleaver 835 that rearranges the sequence of complex symbols output from the mapper. The illustrated symbol interleaver 835 is positioned after the mapper 830. In other embodiments, the symbol interleaver 835 may be positioned between the FEC and the mapper 830 in place of the bit interleaver. In such embodiments, the symbol interleaver permutes the predetermined number of bits as a symbol group. For example, in an embodiment where a QAM mapper maps four data bits to a complex symbol, the symbol interleaver is configured to interleave groups of four data bits.

In an embodiment where the symbol interleaver 835 is positioned after the mapper 830, the symbol interleaver rearranges the sequence of the symbols output from the mapper 830. In one embodiment, the symbol interleaver 835 can include a random interleaver which employs a fixed random permutation order and interleaves symbols according to the permutation order. For example, the random interleaver may use Radix-2 FF operation. In other embodiments, the symbol interleaver 835 can include a block interleaver. A block interleaver accepts a set of symbols and rearranges them without repeating or omitting any of the symbols in the set. The number of symbols in each set is fixed for a given interleaver. The interleaver's operation on a set of symbols is independent of its operation on all other sets of symbols.

The output of the symbol interleaver 835 is sent to an inverse Fast Fourier Transform (IFFT) module 840. The IFFT 840 transforms frequency domain data from the error-correcting, mapping and interleaving modules back into corresponding time domain data. The IFFT module 840 converts a number of complex symbols, which represent a signal in the frequency domain, into the equivalent time domain signal. The IFFT module 840 also serves to ensure that carrier signals produced are orthogonal. The output of the IFFT 840 is sent to a cyclic prefix adder 845 so as to decrease receiver complexity. The cyclic prefix adder 845 may also be referred to as a guard interval adder. The cyclic prefix adder 845 adds a cyclic prefix interval (or guard interval) to an IFFT-processed signal block at its front end. The duration of such a cyclic prefix interval may be 1/32, 1/16, 1/8, or 1/4 of the original signal block duration.

At this point of the transmitter chain 800, a preamble 850, such as the preamble 400 (FIG. 4), is inserted into a packet, such as the packet 300 (FIG. 3), as part of the header 310 and prior to the IFFT-processed signal block. The preamble 850 is chosen by the designers of the system 200, such as previously described, and is standardized so that all devices of the system understand it.

A symbol shaping module 855 interpolates and low-pass filters the packet signal generated from the IFFT module 840, the cyclic prefix adder 845 and the preamble 850. The output of the symbol shaping module 855 is a complex baseband of the output signal of the IFFT module 840. An upconverter 860 upconverts the output of the symbol shaping module 855 to an intermediate frequency (IF). The upconverter 860 is further configured to upconvert the upconverted signal to a radio frequency (RF). A set of transmit antennas 865 transmit the signal output from the upconverter 860 over a wireless medium, such as the wireless channel 201 (FIG. 2) to a receiver. The transmit antennas 865 can include any antenna system or module suitable for wirelessly transmitting uncompressed HD video signals.

Figure 9:
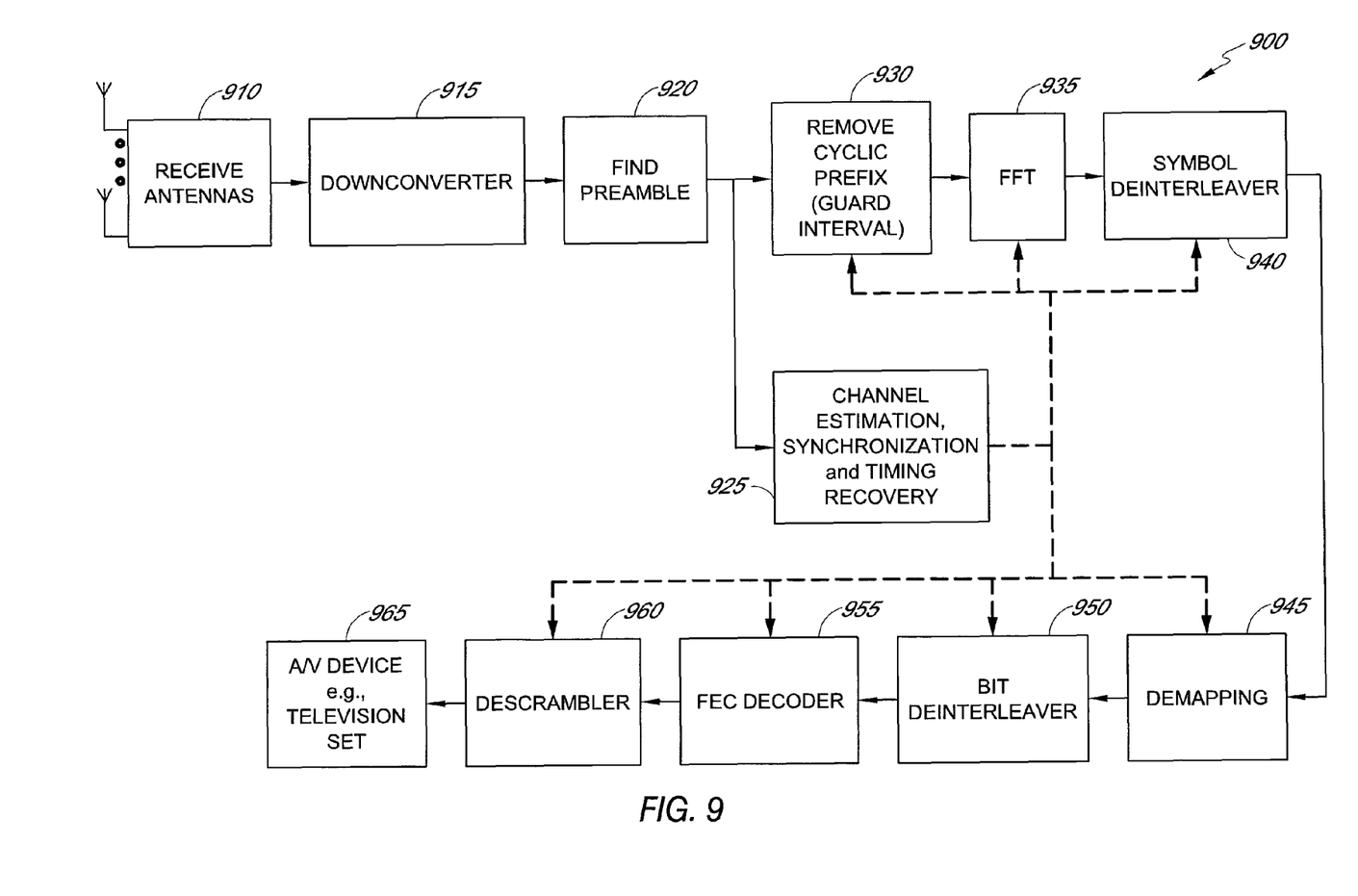
FIG. 9 is a block diagram of an embodiment of a receiver chain of components such as used in the receiver shown in FIG. 2.

Referring to FIG. 9, a receiver chain 900 of modules, subsystems or devices, such as used in the PHY block 214 (FIG. 2), will be described. The receiver chain modules perform an inverse process of that of the transmitter chain 800 of FIG. 8. The receiver 900 receives an RF signal via the wireless channel 201 (FIG. 2) at receive antennas 910 from the transmit antennas 865 of the transmitter 800. A downconverter 915 downconverts the RF signal to a signal of a frequency suitable for processing. Then, an analog-to-digital converter (not shown) converts the signal into a digital signal. A preamble finder 920 then locates a preamble portion of the digital signal. In certain embodiments, the preamble finder 920 includes a correlator and a packet start finding algorithm that can operate on the short training sequences of the preamble (FIGS. 4 and 7). After the preamble is identified by the finder 920, the preamble portion of a current signal packet is sent to a channel estimation, synchronization and timing recovery component 925, which will be further described below. A cyclic prefix remover 930 removes the cyclic prefix of the preamble from the signal. In certain embodiments, there is also a cyclic prefix for the video data portion of the packet such that there is a cyclic prefix in every OFDM symbol to reduce the effect of inter-symbol interference caused by the channel delay spread. This cyclic prefix is different than the cyclic prefix in the preamble. However, two purposes for adding the cyclic prefix in the preamble include also being able to cope with the channel delay spread and to get better channel estimation using the long preamble. Next, a fast Fourier transform (FFT) module 935 transforms the signal (a time-domain signal) into a frequency-domain signal. The output of the FFT 935 is used by a symbol deinterleaver 940 which rearranges the FFT output for a demapper 945. The demapper 945 converts the frequency-domain signal (a complex signal) into a bit stream in the time domain. A bit deinterleaver 950 rearranges the bit stream in the original bit stream sequence as before the bit interleaver 825 of FIG. 8.

Subsequently to the bit deinterleaving, a FEC decoder 955 decodes the bit stream, thereby removing redundancy added by the FEC 820 of FIG. 8. In one embodiment, the FEC decoder 955 includes a demultiplexer, a multiplexer, and a plurality of convolutional code (CC) decoders interposed between the demultiplexer and the multiplexer. Finally, a descrambler 960 receives the output from the FEC decoder 955, and then descrambles it, thereby regenerating the video data sent from the transmitter 800 of FIG. 8. A video device 965 can now display video using the video data. Examples of the video device include, but are not limited to, a CRT television, an LCD television, a rear-projection television and a plasma display television. It will be appreciated that audio data can also be processed and transmitted in the same manner along with video data by the wireless HD A/V system described above. The audio data can be processed and transmitted using a different wireless transmission scheme. The descrambler 960, FEC decoder 955, bit deinterleaver 950, demapper 945, symbol deinterleaver 940, FFT 935 cyclic prefix remover 930, downconverter 915 and receive antennas 910 of the receiver chain 900 perform analogous but inverse functions of the corresponding scrambler 815, FEC 820, bit interleaver 825, mapper 830, symbol interleaver 835, IFFT 840, cyclic prefix adder 845, upconverter 860 and transmit antennas 865 of the transmitter chain 800.

In certain embodiments, the channel estimation, synchronization and timing recovery component 925 comprises digital circuits such as in a portion of a field programmable gate array (FPGA). The component 925 extracts "channel knowledge" by processing the short training sequences and then the long training sequences (FIGS. 4 and 7). The channel knowledge can change from packet to packet and reflects current channel conditions. The wireless channel may change due to environmental factors, such as people or pets moving in a room, etc. The channel knowledge affects data decisions and can be used by some or all components 930 to 960 as shown by the dashed line in FIG. 9. The channel knowledge obtained by processing the short training sequences includes a coarse frequency offset estimate, coarse timing estimate, and automatic gain control. The channel knowledge obtained by processing the long training sequences includes channel estimation, a fine frequency offset estimate, and a fine timing estimate.

CONCLUSION

While the above detailed description has shown, described, and pointed out the fundamental novel features of the invention as applied to various embodiments, it will be understood that various omissions and substitutions and changes in the form and details of the system illustrated may be made by those skilled in the art, without departing from the intent of the invention.

What is claimed is:

1. A method of transmitting uncompressed video information from a sender to a receiver over a wireless channel, the method comprising:
   providing uncompressed video information bits at the sender;
   packetizing the video information bits into one or more packets;
   providing a preamble to precede data in each packet, wherein the preamble includes a set of short training sequences and a set of long training sequences, wherein the set of short training sequences consists of seven short training sequences and the set of long training sequences consists of two long training sequences; and
   transmitting multiple packets from the sender to the receiver over a wireless channel.

2. The method of claim 1, wherein the preamble is inserted into the packet prior to symbol shaping, upconversion, and the transmitting.

3. The method of claim 1, wherein the total length of the preamble is five orthogonal frequency-division multiplexing (OFDM) symbols long.

4. The method of claim 1, wherein each short training sequence is 256 samples.

5. The method of claim 1, wherein each long training sequence is 512 samples.

6. The method of claim 1, wherein the set of short training sequences comprises a repetition of a certain sequence, with the last repetition rotated by 180 degrees.

7. The method of claim 1, wherein the set of short training sequences comprises a repetition of a certain sequence, with the last repetition not rotated by 180 degrees.

8. The method of claim 1, wherein a length 64 guard interval separates the set of short training sequences and the set of long training sequences.

9. The method of claim 1, wherein the preamble comprises seven length 256 short training sequences, a length 64 guard interval and two length 512 long training sequences for a total length of five OFDM symbols.

10. The method of claim 1, wherein each short training sequence is defined in a frequency domain using quadrature phase shift keying (QPSK) signals and each long training sequence is defined in the frequency domain using binary phase shift keying (BPSK) signals.

11. The method of claim 1, wherein a length of each of the short training sequences is one half of a length of each of the long training sequences.

12. The method of claim 1, wherein transmitting the multiple packets comprises transmitting the multiple packets in a 59-61 GHz bandwidth channel.

13. A system having a preamble design for wireless communication of uncompressed high definition video, the system comprising:
   a transmitter configured to generate signal packets corresponding to a high definition video stream, wherein each signal packet comprises a header portion and video data portion, wherein the header portion begins with a preamble having a set of short training sequences and a set of long training sequences, wherein the set of short training sequences consists of seven short training sequences and the set of long training sequences consists of two long training sequences; and
   a wireless channel configured to transmit the signal packets representative of the uncompressed high definition video.

14. The system of claim 13, wherein each short training sequence is defined in a frequency domain using quadrature phase shift keying (QPSK) signals and each long training sequence is defined in the frequency domain using binary phase shift keying (BPSK) signals.

15. The system of claim 13, wherein the total length of the preamble is five orthogonal frequency-division multiplexing (OFDM) symbols long.

16. The system of claim 13, wherein each short training sequence is 256 samples.

17. The system of claim 13, wherein each long training sequence is 512 samples.

18. The system of claim 13, wherein the set of short training sequences comprises a repetition of a certain sequence, with the last repetition rotated by 180 degrees.

19. The system of claim 13, wherein the set of short training sequences comprises a repetition of a certain sequence, with the last repetition not rotated by 180 degrees.

20. The system of claim 13, wherein a length 64 guard interval separates the set of short training sequences and the set of long training sequences.

21. The system of claim 13, wherein the preamble comprises seven length 256 short training sequences, a length 64 guard interval and two length 512 long training sequences for a total length of five OFDM symbols.

22. A system for transmitting uncompressed video information from a sender to a receiver over a wireless channel, the system comprising:

means for providing uncompressed video information bits at the sender;

means for packetizing the video information bits into one or more packets;

means for providing a preamble to precede data in each packet, wherein the preamble includes a set of short training sequences and a set of long training sequences, wherein the set of short training sequences consists of seven short training sequences and the set of long training sequences consists of two long training sequences; and     means for transmitting multiple packets from the sender to the receiver over a wireless channel.

23. The system of claim 22, wherein each short training sequence is 256 samples and each long training sequence is 512 samples.

24. The system of claim 22, wherein the preamble comprises seven length 256 short training sequences, a length 64 guard interval and two length 512 long training sequences for a total length of five OFDM symbols.

25. The system of claim 22, wherein each short training sequence is defined in a frequency domain using quadrature phase shift keying (QPSK) signals and each long training sequence is defined in the frequency domain using binary phase shift keying (BPSK) signals.

\* \* \* \* \*